Patented Oct. 9, 1928.

1,686,556

UNITED STATES PATENT OFFICE.

GLENN G. GRISWOLD, OF MADISON, OHIO.

EMULSIFIED FOOD PRODUCT.

No Drawing.   Application filed April 29, 1926. Serial No. 105,573.

This invention relates to food products, and more especially to a food product of an emulsified nature formed from a permanent syrup or a similar substance, more especially honey.

It is well known that a butter-like substance can be prepared from granulated honey by agitating the honey under suitable conditions to produce a frothy or flaky appearance therein, the agitation being effected under conditions favorable to the breaking up of the granular particles thereof.

The so called butter thus produced is objectionable for the reason that it will not remain in this state for any sustained period of time. Under proper conditions it can be kept in this state for as long as six months, but if it is subjected to summer temperatures or to elevated temperatures it will return to the normal state of extracted honey, and while passing back to the normal state it will appear curdled and have the appearance of undergoing a process of curdling or fermentation. Besides being unstable, this product as heretofore made has always had a distinctly granular appearance and grain.

The present invention, which is applicable chiefly to the treatment of extracted honey, but can also be applied to the treatment of permanent syrup, such for instance as maple syrup, has for its object to produce a permanent emulsion which will resist elevated temperatures and which will permanently retain its creamy, smooth appearance and without any process of granulation taking place.

A further object of the present invention is to provide a smooth, cream-like emulsion of this character having other food products incorporated therein, such as mixed nuts or peanut butter, to produce a delectable, nutritious and well balanced food.

By the term "permanent syrup" as herein used, I refer to extracted liquid in which there is no granulation honey and to maple syrup or other syrup which will not become hard at normal temperatures.

In carrying out my invention egg albumen is beaten up in a suitable mixing apparatus of any well known or preferred type until a stiff froth is produced. The honey or syrup is then mixed with the albumen and the same agitated for several minutes usually about twenty minutes, but for a longer or shorter period as conditions require until a creamy paste which is entirely without grain is produced. This paste constitutes a permanent emulsion, which will remain creamy and in which no segregation of the egg and honey or the egg and syrup will take place.

As a specific example of the manner in which my invention may be carried out, one ounce of egg albumen, dried and powdered, is mixed with four ounces of cold water, and the mixture beaten to a stiff froth. To this froth one gallon of extracted liquid, nongranular honey is added, the honey preferably being at an elevated temperature, and more particularly at a temperature above 150 degrees, I have found that if the honey is at a temperature of 180 degrees the most satisfactory results will be procured. At a temperature of 180 F. the honey is not sufficiently hot to be discolored and the aroma thereof is not lost while the emulsion which is procured is of a most satisfactory nature.

While I have illustrated in the foregoing a specific formula for practicing the invention, the invention is not confined to the proportions or to the temperatures therein stated. By modification of the proportions and by changing the period of time which the mixture is whipped or agitated, the consistency of the product can be varied. Neither is the invention confined to the use of dry egg albumen, as the natural albumen could of course be used just as well.

This product may be put up in jars and sold to the trade as a permanent staple honey cream, and should of course be sealed in the jars while hot. If so desired, fruits, whole or chopped, food particles, mixed nuts or peanut butter can be incorporated therewith to provide a spread which is both palatable and nutritious. As one example, one part of peanut butter may be added with six parts of the honey cream. In this condition the peanut butter does not cling to the mouth or produce the same dry sensation in the mouth that is so objectionable to peanut butter alone.

A further advantage of the invention is that besides producing a creamed honey which is smooth and entirely without grain and more permanent and less sticky than the product ordinarily sold to the trade, the bulk of the honey is substantially doubled so that a given quantity by measure of the emulsion is less expensive than the creamed honey heretofore sold and the superior product can be sold commercially in a more profitable way.

An important feature of the present invention is that the paste-like emulsion is made from clear liquid extracted honey, whereas the so called honey-butter heretofore used has always been made only from granulated honey in its granular condition.

Instead of using honey, to which the invention is most particularly applicable, it can be practiced in the same way with the use of syrup in place of honey: When syrup is used it is introduced into the egg albumen in the same way that the honey is mixed and emulsified. The syrup used can be maple syrup or any other syrup which does not tend to become hard or to set at substantial normal temperatures. While I am aware of the fact that candy is sometimes made by the mixing of a hot syrup with beaten-up white of egg, the syrup used is a syrup which will become hard when fairly cold and which consequently is not a permanent syrup. While a candy has been made in this manner, it has never been proposed to provide a spread in the form of a syrup emulsion which is permanent and which can be sold in jars as a food cream by this method. More especially, it has never been proposed to prevent honey from going back to the natural granular condition of extracted honey by emulsifying the honey as herein described.

The emulsion thus produced is a valuable addition to food products, and can be used in a variety of ways as a spread for bread or crackers, and icing or covering for cake, as a filler for pastry, as a topping for ice cream and can be formed into confections and used in a variety of ways as a desssing. When made of pure honey, it can be safely used by physicians for patients whose diet must be carefully guarded, this product possessing all of the dietetic value of the pure honey.

It will also be understood that flavoring extracts may be added, whenever desired, to the emulsion as well as liquid or solid food substances of any character.

I claim:

1. A food product comprising a permanently syrup-like substance emulsified with egg albumen.

2. A food product comprising a cream consisting of permanently emulsified honey and albumen.

3. A food product comprising a paste-like emulsion of honey and egg albumen.

4. The method of emulsifying honey which consists in beating it with egg albumen.

5. The method of emulsifying honey which consists in beating it while hot with egg albumen.

6. The herein described method of forming a food paste which consists in making a froth containing egg albumen and then whipping honey into the albumen.

7. The method of emulsifying honey which consists in heating the honey to approximately 180 degrees, and then beating the honey with egg albumen which has been previously whipped.

8. The herein described method emulsifying a syrup-like substance which consists in mixing the syrup-like substance with egg albumen under such conditions as to form an emulsion in the proportion of substantially one gallon of syrup-like substance to the equivalent of one ounce of dry egg albumen.

In testimony whereof I have hereunto set my hand.

GLENN G. GRISWOLD.